United States Patent [19]

Ficker et al.

[11] Patent Number: 4,692,489

[45] Date of Patent: * Sep. 8, 1987

[54] POLYPROPYLENE COMPOSITIONS OF IMPROVED CLARITY

[75] Inventors: Harold K. Ficker, Wayne, N.J.; Frederick M. Teskin, Herndon, Va.

[73] Assignee: El Paso Products Company, Odessa, Tex.

[ * ] Notice: The portion of the term of this patent subsequent to Aug. 4, 2004 has been disclaimed.

[21] Appl. No.: 762,904

[22] Filed: Aug. 6, 1985

[51] Int. Cl.$^4$ .......................... C08K 5/09; C08K 5/17
[52] U.S. Cl. ..................................... 524/243; 524/218; 524/220; 524/223; 524/224; 524/228; 524/229; 524/242; 524/244; 524/245; 524/327; 524/583
[58] Field of Search ............... 524/243, 327, 242, 218, 524/220, 223, 228, 229, 224, 583, 244, 245

[56] References Cited

U.S. PATENT DOCUMENTS

| Re. 27,404 | 6/1972 | Williams, Jr. et al. | 526/352.2 |
| 3,886,227 | 5/1975 | Van Brederode et al. | 525/286 |
| 4,147,742 | 4/1979 | Castro et al. | 524/223 |
| 4,184,026 | 1/1980 | Carrock et al. | 524/288 |
| 4,314,040 | 2/1982 | Castro et al. | 524/249 |
| 4,393,159 | 7/1983 | Lybrand | 524/243 |
| 4,520,163 | 5/1985 | Goodall | 525/247 |
| 4,543,389 | 9/1985 | Burstain et al. | 526/903 |

Primary Examiner—Herbert J. Lilling
Attorney, Agent, or Firm—Fred S. Valles; Margareta LeMaire

[57] ABSTRACT

Incorporation of an ethoxylated amine in a sodium benzoate nucleated propylene polymer resin synergistically improves clarity as well as yellowness over what is achieved by use of sodium benzoate or ethoxylated amine alone.

6 Claims, No Drawings

POLYPROPYLENE COMPOSITIONS OF IMPROVED CLARITY

BACKGROUND OF THE INVENTION

The present invention relates to a method of improving the clarity and yellowness of propylene polymers produced in the presence of supportbased, high activity coordination catalysts. These polymers generally do not require deashing prior to use and therefore contain acidic catalytic residues which need to be neutralized prior to processing of the polymer. In order to improve the polymer clarity, sodium benzoate can be added as a nucleating agent, however, because of the presence of catalytic residues and neutralizing agents in the polymer, the improvements in clarity has not been as great as what would be desired. Also, the polymer color as measured by the yellowness index, has not been quite satisfactory.

THE INVENTION

In accordance with this invention, there is provided a method for synergistically improving the clarity and color of an undeashed propylene polymer prepared in the presence of a high-activity catalyst composition containing a magnesium halide-supported titanium halide catalyst component, adding sodium benzoate and an ethoxylated amine to the polymer in the absence of calcium stearate, melting the resulting mixture and solidifying the melted mixture.

It was unexpectedly found that the incorporation of an ethoxylated amine into the sodium benzoate-nucleated polypropylene resin improved the clarity, as measured by percent haze, and reduced the yellowness index in a synergistic manner, i.e., these properties were far better than what could be predicted from those obtained by use of sodium benzoate alone and ethoxylated amine alone.

The polymers which are useful in this invention are derived predominantly from propylene (i.e., at least 75% by weight) and are produced by well-known processes involving the use of any of the recently developed supported, highly active and stereospecific catalysts. Generally, these new catalysts are comprised of an aluminum alkyl component and a titanium compound supported on magnesium dihalide as a second component. Homopolymers, copolymers of propylene with other simple 1-olefins such as ethylene and butene-1, and blends thereof can be used. Also, other 1-olefin resins can be blended with any of the aforementioned propylene resins, e.g. linear low density polyethylene (LLDPE) which is an interpolymer of ethylene and at least one $C_4$–$C_8$ 1-olefin. The LLDPE resins are mainly categorized according to density rather than chemical composition and should have a density in the range between about 0.915 and about 0.940. The polymerized propylene content of the total polymer, whether it be composed of one or more components, should preferably be at least 80% by weight. Random copolymers of propylene and ethylene containing between about 2 and about 10 wt % ethylene, and mixtures of such random copolymers with a LLDPE resin are especially suitable.

In order to improve the lack of clarity generally associated with highly crystalline propylene polymers, sodium benzoate is added to the propylene polymer, thereby controlling the rate of crystal growth as the molten polymer solidifies upon cooling in the final molding step. Any known process may be used to incorporate the sodium benzoate, which is usually added to provide a concentration of from about 0.01 to about 1% by weight based on the polymer weight, preferably from about 0.05 to 0.5 wt %. For instance, the techniques disclosed in U.S. Pat. Nos. 3,207,739, 3,367,926, 3,637,634 and 4,184,026 (hereby incorporated into this application by reference) are all suitable.

One or more neutralizing agents should be added to the polymer in quantities effective to reduce the corrosive effect of the support-based catalyst residues present in the polymer and to increase the thermal stability of the polymer. Such neutralizing agents are well-known and commercially available. Suitable neutralizing compounds include the hydroxides of sodium, potassium and calcium, oxides of calcium and magnesium, sodium carbonate, calcium carbonate, magnesium hydroxycarbonate and mixtures thereof. Generally, the concentration of neutralizer should range between about 0.01 to about 3% by weight based on the polymer weight. This concentration does not include the sodium benzoate and the ethoxylated amine which also act as neutralizers.

To increase the thermal and oxidative stability of the polymer, any of the well-known commercially available antioxidants such as hindered phenols, phenolic phosphites, secondary aryl amines and the like, should be incorporated into the polymer resin usually in quantities between about 0.01 to about 1%, preferably between about 0.05 to about 0.5% by weight based on the polymer weight. Examples of such antioxidants include butylated hydroxytoluene, tetrakis methylene-(3,5-di-t-butyl-4-hydroxyhydrocinnamate)methane, (1,3,5-trimethyl-2,4,6-tris (3,5-t-butyl-4-hydroxybenzyl)benzene, bis(2,4-di-t-butylphenyl) pentaerythritol diphosphite, phenylenediamines, 3,5-di-tert-butyl-4-hydroxyhydrocinnamic acid triester with 1,3,5-tris (2-hydroxyethyl)-s-triazine-2,4,6(1H,3H,5H)-trione and many others.

The ethoxylated amine useful in this invention should be a fatty acid alkanol amine derived from fatty acids containing 3 to 20 carbon atoms. Examples of such ethoxylated amines are bis(hydroxyethyl)cocoamine bis (hydroxyethyl)tallow amines, bis(hydroxyethyl)-myritylamine, etc. These compounds are commercially available to be used as internal antistatic agents. When used as a clarifying agent as in the method of this application, the concentration should be in the range from about 0.05 to about 0.5% by weight.

Other special function additives can also be incorporated into the polymer such as colorants, antiblocking agents, lubricants etc., provided that the additive is not a metal stearate such as calcium stearate.

Any conventional nucleation technique may be used for uniformly dispersing the additives within the polymer, for melting the polymer and for solidifying the polymer, and therefore, need not be discussed in any further detail.

Shaped articles may be manufactured form the mixtures according to this invention by casting, compression molding or injection molding; films may be obtained by blowing or by slit extrusion; filaments, bars, tapes and the like, may be obtained by extrusion.

Various details of the invention will be more fully understood in perspective of the specific illustrative emodiments described in the following examples.

EXAMPLES 1-6

The resin used in each of the blends of Examples 1-6 was a random copolymer of 97.2 wt % propylene and 2.8 wt % ethylene having a melt flow rate of 2.7 g/10 min (ASTM 1238D) and containing 200 ppm of butylated hydroxytoluene (BHT). The polymer was undeashed and had been produced in the presence of a high activity magnesium chloride-supported titanium chloride catalyst in a slurry polymerization process employing propylene monomer as liquid diluent.

Most of the blends were prepared to contain the same amount of antioxidant stabilizer, in this case 1,3,5-trimethyl-2,4,6-tris (3,5-t-butyl-hydroxybenzyl)benzene (Ethyl 330), and also of primary neutralizer, i.e., aluminum magnesium hydroxycarbonate (Kyowa DHT-4A).

The additives incorporated into each of the blends are indicated in Table 1. Where included, the sodium benzoate was added to the resin as a 10 wt % solution in a n-propanol/water azeotrope solvent (71.8/28.2 wt % composition). After intensive mixing for about 3 minutes under nitrogen atmosphere the blend was dried under nitrogen at about 65° C. for 3 hours. Any other components to be included were then added into the blend by mixing under nitrogen atmosphere for about 3 minutes. All blends were prepared by this general technique.

The blends were then extruded at a nominal 500° F. melt temperature and pelletized. 50 mil and 125 mil plaques were pressure molded from the pellets. The 50 mil plaques were tested for percent haze (ASTM D 1003), and yellowness index (ASTM D 1925) was measured on the 125 mil plaques.

The test results are shown in Table 1.

TABLE I

| Example No. | Comp. 1 | Comp. 2 | Comp. 3 | Comp. 4 | Comp. 5 | 6 |
|---|---|---|---|---|---|---|
| Additives - ppm | | | | | | |
| ETHYL 330 | 1000 | 1000 | 1000 | 1000 | 1000 | 1000 |
| DHT-4A | 1000 | 1000 | 1000 | 1000 | 1000 | 1000 |
| Na Benzoate | — | 1000 | — | — | 1000 | 1000 |
| Armostat 410 | — | — | 1000 | 1000 | 1000 | 1000 |
| Ca Stearate | 1000 | — | 1000 | — | 1000 | — |
| Results | | | | | | |
| Haze - % | 49.1 | 43.5 | 49.8 | 48.6 | 52.0 | 39.9 |
| YI | 13.3 | 11.6 | 4.5 | 4.3 | 4.5 | 1.0 |
| Melt Flow - b/10 min | 3.0 | 2.6 | 2.6 | 2.6 | 3.0 | 2.7 |

Comparison of the results from Experiments 1 and 2 show that the resin nucleated with sodium benzoate had an improved clarity, i.e., a reduction in percent haze. However, the yellowness index was barely affected by the sodium benzoate. Comparative Example 3 shows that the addition of an ethoxylated amine (Armostat TM 410=bis(hydroxyethyl) cocoamine) to the blend of comparative Example 1 resulted in a reduction of yellowness index only, and the same result was obtained in the absence of calcium stearate, as shown by the data from comparative Example 4. No significant difference in properties were obtained in comparative Example 5 using the blend of Example 3 but nucleated with sodium benzoate.

In Example 6, however, the blend, which was nucleated with sodium benzoate and contained an ethoxylated amine, showed an unexpected further reduction in both haze and yellowness index indicating that the ethoxylated amine acts as a synergist provided that no calcium stearate is present in the blend. These findings are particularly evident from a comparison of the results from Examples 2, 4 and 5.

EXAMPLES 7-9

The blends of these examples were essentially similar to those of Examples 2, 4 and 6 except that the antioxidant was replaced with tetrakis methylene-(3,5-di-t-4-hydroxyhydrocinnamate)methane (Irganox TM 1010). The synergistic effect of the ethoxylated amine is again demonstrated by a comparison of the data from Example 9 with those of comparative Examples 7 and 8, as shown in Table II.

TABLE II

| Example No. | Comp. 7 | Comp. 8 | 9 |
|---|---|---|---|
| Additives - ppm | | | |
| Irganox 1010 | 1000 | 1000 | 1000 |
| DHT-4A | 1000 | 1000 | 1000 |
| Na Benzoate | 1000 | — | 1000 |
| Armostat 410 | — | 1000 | 1000 |
| Results | | | |
| Haze - % | 48.5 | 49.5 | 38.7 |
| YI | 8.9 | 5.0 | 1.7 |
| Melt Flow g/10 min. | 3.0 | 2.8 | 3.2 |

EXAMPLES 10 and 11

The blends of Examples 10 and 11 were similar to those of Examples 2 and 6 except that the resin was a blend of 90 wt % of a random copolymer of propylene and ethylene (2.8 wt % ethylene and 2.7 melt flow rate) and 10 wt % of a linear low density polyethylene (0.1 melt index, 0.9191 density and 3.5 polydispersity). Haze measurements on samples prepared from these blends showed a decrease in haze and increase in visual clarity of the resin blend of Example 11 containing Armostat 410, illustrating the synergistic effect of ethoxylated amines on the clarity of propylene polymer resins nucleated with sodium benzoate.

The results are shown in Table III.

TABLE III

| Example | Comp. 10 | 11 |
|---|---|---|
| Additives - ppm | | |
| Ethyl 330 | 1000 | 1000 |
| DHT-4A | 1000 | 1000 |
| Na Benzoate | 1000 | 1000 |
| Armostat 410 | — | 1000 |
| Results | | |
| Haze - % | 56 | 43 |
| MF - g/10 min. | 3.4 | 3.6 |

It is to be understood that many modifications and alterations can be made to this invention without departing from its scope, which is defined by the specification and appended claims.

What is claimed is:

1. A method for improving the color and clarity of an undeashed propylene polymer prepared in the presence of a high-activity catalyst composition containing a magnesium halide-supported titanium halide catalyst component, which method consists essentially of
   (a) adding (i) from about 0.01 to about 3% by weight of a neutralizer selected from the group consisting of hydroxides of sodium, potassium and calcium, oxides of calcium and magnesium, sodium carbonate, calcium carbonate, magnesium hydroxycarbonates and mixtures thereof,
   (ii) from about 0.01 to about 1% by weight of sodium benzoate and
   (iii) from about 0.05 to about 0.5% by weight of an ethoxylated amine to the polymer in the absence of calcium stearate, all percentages being based on the polymer weight,
   (b) melting the resulting mixture and
   (c) solidifying the melted mixture.

2. The method of claim 1 wherein the propylene polymer resin contains at least 75% by weight of polymerized propylene constituents.

3. The method of claim 2 wherein at least a portion of the propylene polymer resin is a random copolymer of from about 2 to about 10 wt % of ethylene and from about 90 to about 98 wt % of propylene.

4. The method of claim 3 wherein the polypropylene resin also contains a linear low density polyethylene component having a density between about 0.915 and about 0.940.

5. The method of claim 1 wherein the ethoxylated amine is bis(hydroxethyl) cocoamine.

6. The method of claim 1 wherein aluminum magnesium hydroxy carbonate is added to the propylene polymer as neutralizer.

* * * * *